«12» United States Patent
Kowarz et al.

(10) Patent No.: US 6,678,085 B2
(45) Date of Patent: Jan. 13, 2004

(54) HIGH-CONTRAST DISPLAY SYSTEM WITH SCANNED CONFORMAL GRATING DEVICE

(75) Inventors: Marek W. Kowarz, Henrietta, NY (US); James G. Phalen, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/171,252

(22) Filed: Jun. 12, 2002

(65) Prior Publication Data

US 2003/0231373 A1 Dec. 18, 2003

(51) Int. Cl.[7] ........................... G02B 26/00; G02B 26/02
(52) U.S. Cl. ......................................... 359/291; 359/231
(58) Field of Search ................................. 359/291, 290, 359/298, 227, 230, 231

(56) References Cited

U.S. PATENT DOCUMENTS

| | | |
|---|---|---|
| 5,668,611 A | 9/1997 | Ernstoff et al. |
| 5,812,303 A | 9/1998 | Hewlett et al. |
| 5,903,323 A | 5/1999 | Ernstoff et al. |
| 6,307,663 B1 | 10/2001 | Kowarz |
| 6,411,425 B1 * | 6/2002 | Kowarz et al. ............. 359/291 |

* cited by examiner

Primary Examiner—Scott J. Sugarman
Assistant Examiner—Richard Hanig
(74) Attorney, Agent, or Firm—Stephen H. Shaw

(57) ABSTRACT

An improved projection system that includes a conformal grating electromechanical system (GEMS) device for forming an image on a medium, and also including: a light source providing illumination; a linear array of conformal GEMS devices receiving the illumination; an obstructing element for blocking a zeroth order reflected light beam from reaching the medium; a cross-order filter placed substantially near a Fourier plane of a lens system for blocking a plurality of diffracted cross-order light beams from reaching the medium; a scanning element for moving non-obstructed diffracted light beams relative to the medium; and a controller for providing a data stream to the linear array of conformal GEMS devices.

33 Claims, 18 Drawing Sheets

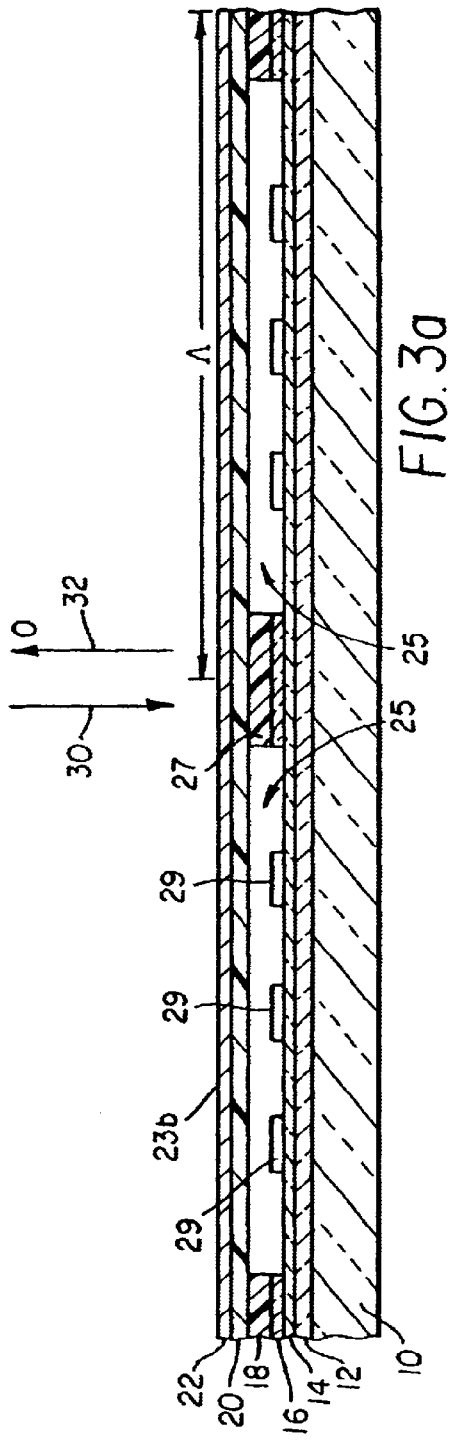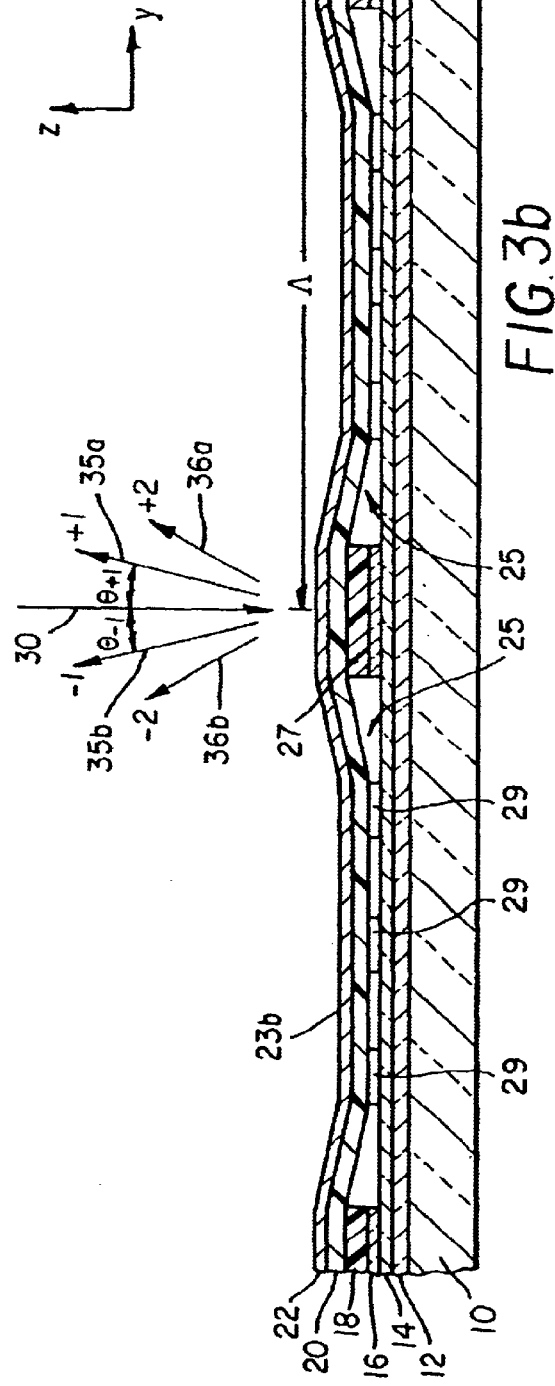

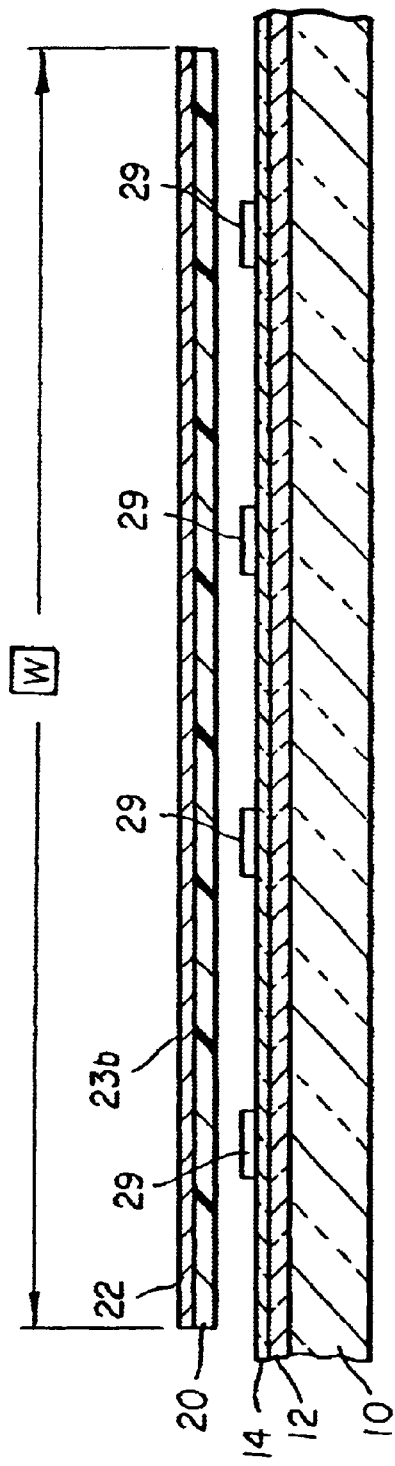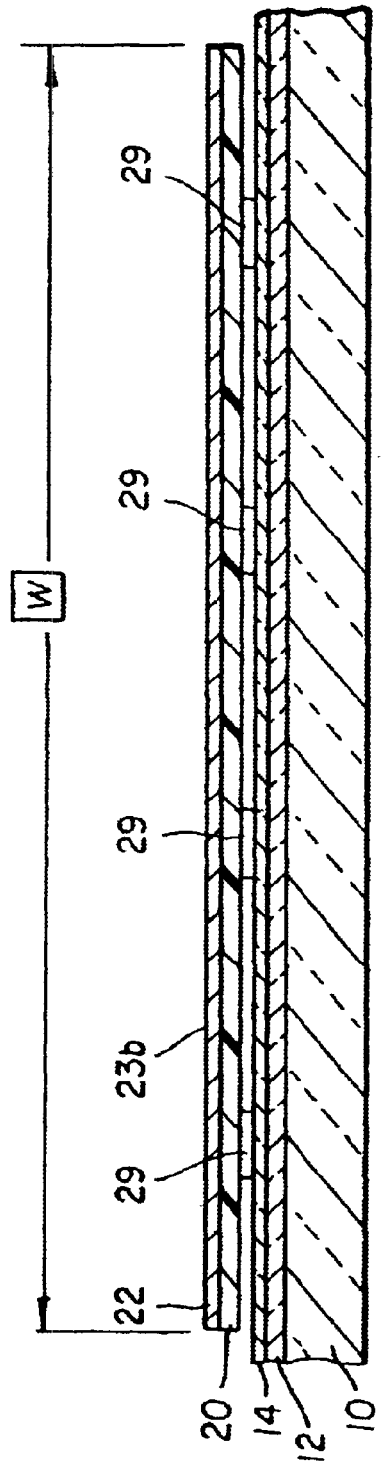
FIG.4a
FIG.4b

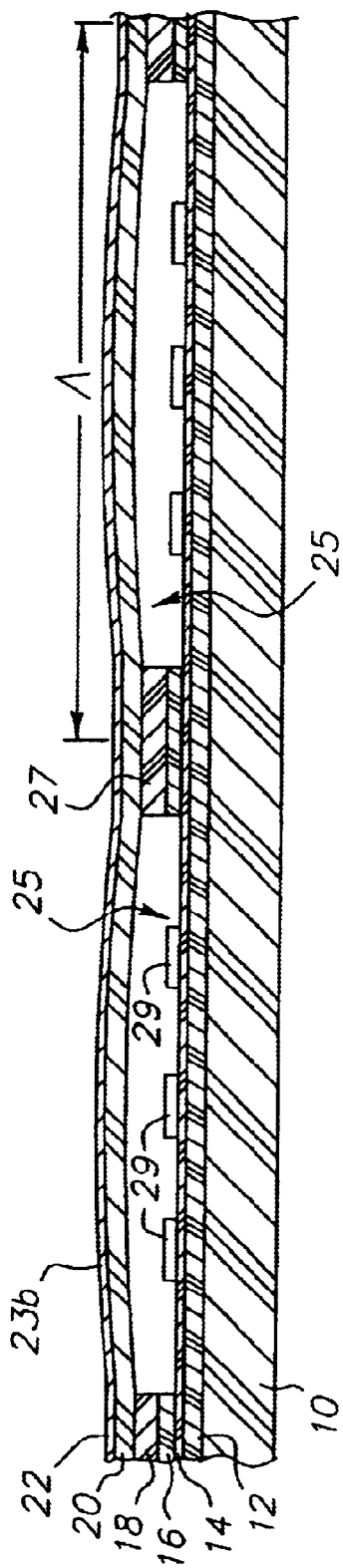
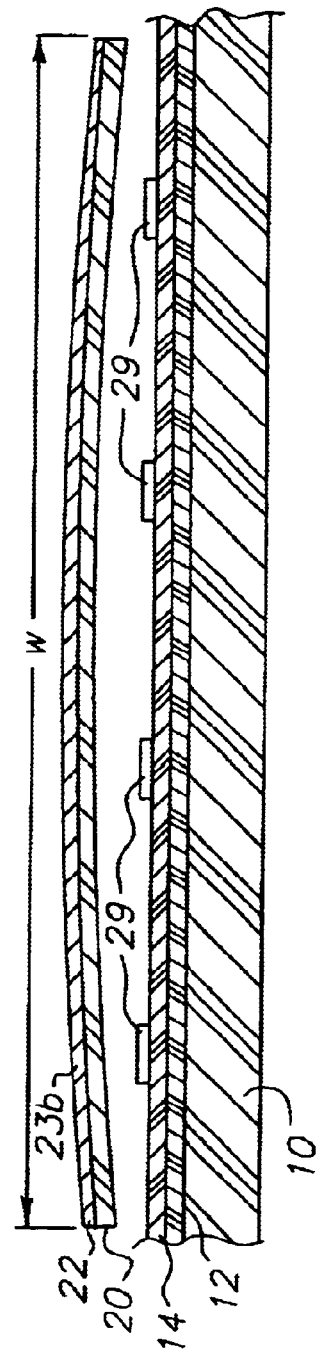

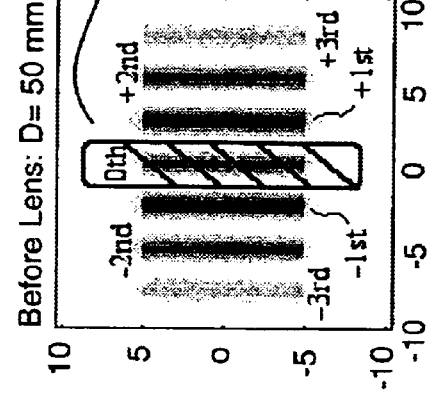
FIG. 12b
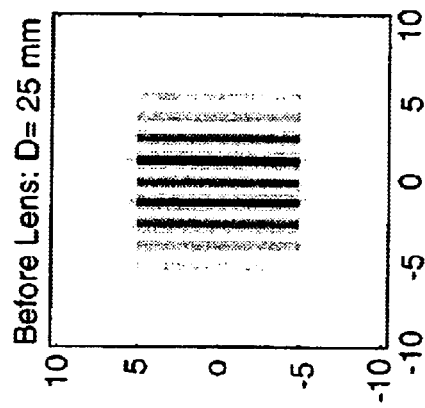
FIG. 12d
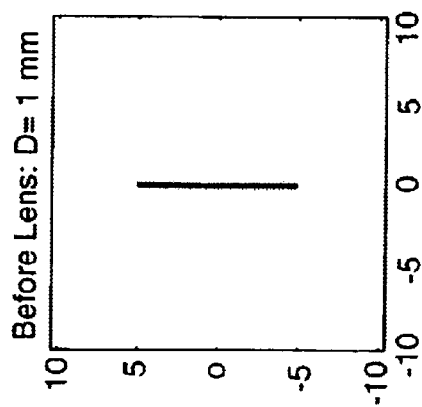
FIG. 12a
FIG. 12c

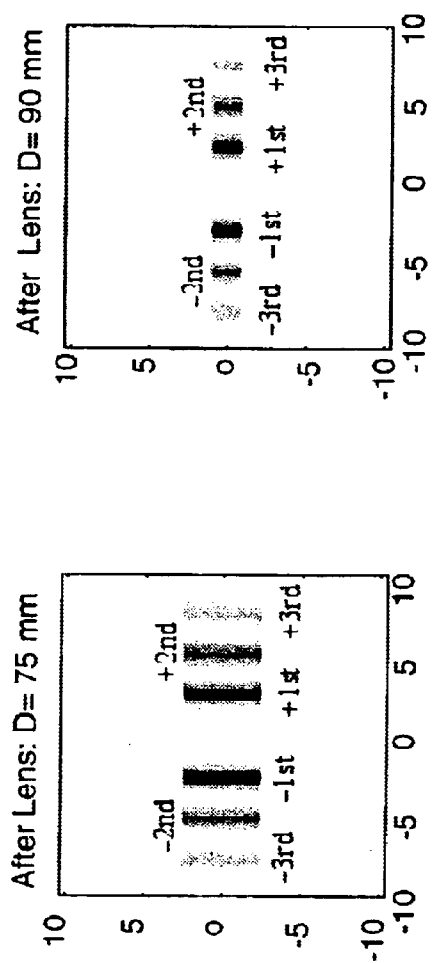

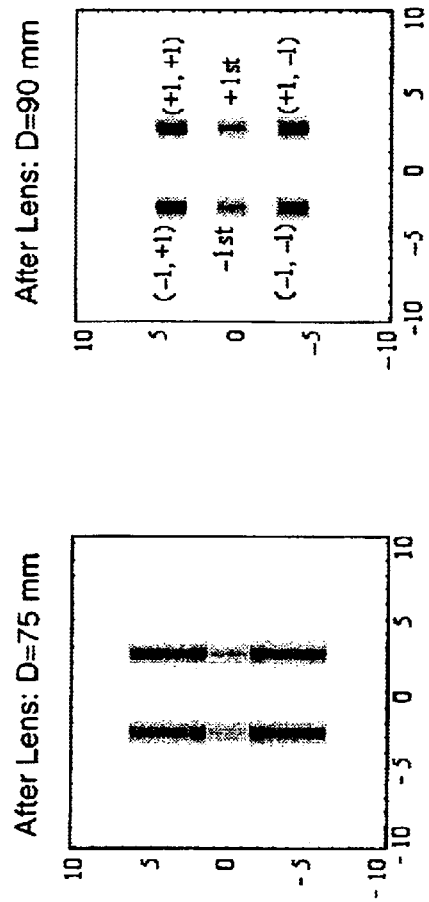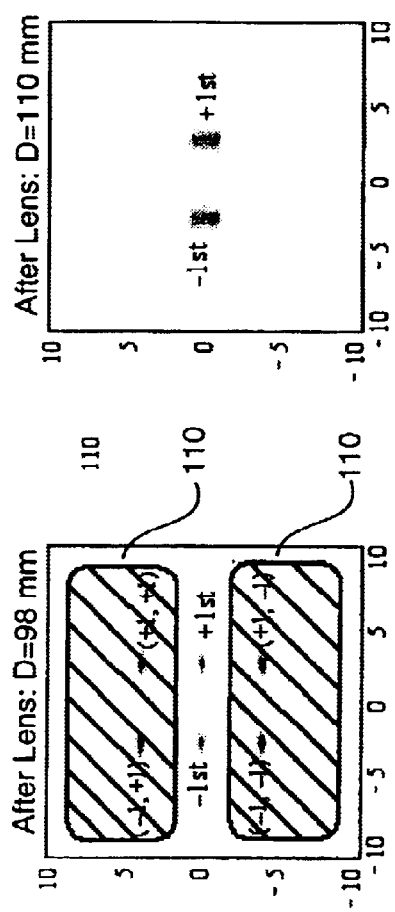
FIG. 14a  FIG. 14b  FIG. 14c  FIG. 14d

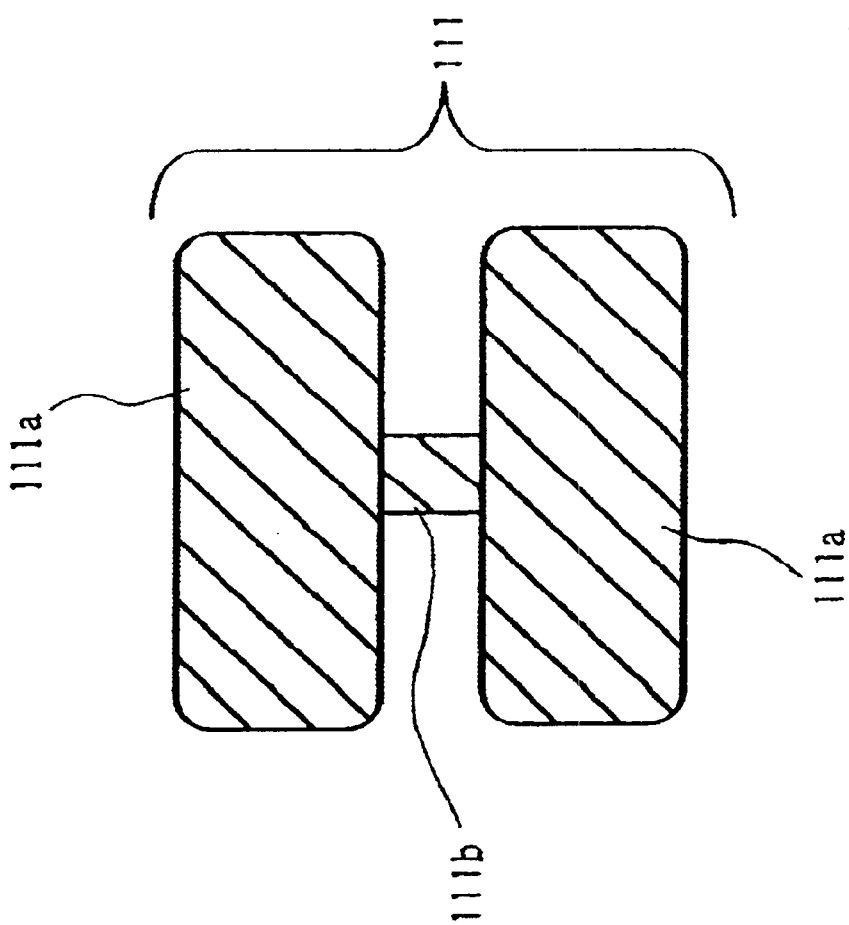

HIGH-CONTRAST DISPLAY SYSTEM WITH SCANNED CONFORMAL GRATING DEVICE

FIELD OF THE INVENTION

This invention relates to a display system with a linear array of electromechanical grating devices that is scanned in order to generate a two-dimensional image. More particularly, the invention relates to a high-contrast laser display system containing electromechanical conformal grating devices.

BACKGROUND OF THE INVENTION

Spatial light modulators based on electromechanical grating devices are important for a wide range of applications, including display, data storage, spectroscopy and printing. Such systems require large numbers of individually addressable devices in either a linear or area array, with over a million addressable devices desirable for an area modulator array in a high-quality display.

Recently, an electromechanical conformal grating device consisting of ribbon elements suspended above a substrate by a periodic sequence of intermediate supports was disclosed by Kowarz in U.S. Pat. No. 6,307,663, entitled "*Spatial Light Modulator With Conformal Grating Device*" issued Oct. 23, 2001. The electromechanical conformal grating device is operated by electrostatic actuation, which causes the ribbon elements to conform around the support substructure, thereby producing a grating. The device of '663 has more recently become known as the conformal GEMS device, with GEMS standing for grating electromechanical system. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system.

While ideal conformal GEMS devices have perfectly planar ribbon elements, fabrication, processing, and material selection can result in actual ribbon elements having an appreciable curvature. Since the ribbon elements are periodic, the ribbon curvature is also a periodic sequence. In a display system, this periodic ribbon curvature produces unintended diffracted light beams that can potentially reduce image contrast if allowed to pass through the optical system and reach the display screen. These unintended beams, referred to as diffracted cross-orders, reduce contrast because they are present even when the conformal GEMS device is in the non-actuated state. There is a need, therefore, for a high-contrast display system, based on conformal GEMS devices, that does not allow diffracted cross-orders to pass through the optical system.

SUMMARY OF THE INVENTION

The need is met according to the present invention by providing an improved projection system that includes a conformal grating electromechanical system (GEMS) device for forming an image on a medium, and also including: a light source providing illumination; a linear array of conformal GEMS devices receiving the illumination; an obstructing element for blocking a zeroth order reflected light beam from reaching the medium; a cross-order filter placed substantially near a Fourier plane of a lens system for blocking a plurality of diffracted cross-order light beams from reaching the medium; a scanning element for moving non-obstructed diffracted light beams relative to the medium; and a controller for providing a data stream to the individually operable devices.

BRIEF DESCRIPTION OF THE DRAWINGS

FIGS. 3a and 3b are cross-sectional views through line 3,5—3,5 in FIG. 2, showing the operation of a conformal GEMS device in an unactuated state and an actuated state, respectively;

FIGS. 4a and 4b are cross-sectional views through line 4—4 in FIG. 2 showing the conformal GEMS device in an unactuated state and an actuated state, respectively;

FIG. 5a is a cross-sectional view through line 3,5—3,5 in FIG. 2, showing an unactuated conformal GEMS device that contains residual ribbon curvature;

FIG. 5b is a cross-sectional view through line 4—4 in FIG. 2, showing an unactuated conformal GEMS device that contains residual ribbon curvature;

FIGS. 12a–12d are density plots of the light distribution in different planes of FIG. 9 between the linear array of conformal GEMS devices and the projection lens, wherein the devices are actuated;

FIGS. 13a–13d are density plots of the light distribution in different planes of FIG. 9 after the projection lens, wherein the conformal GEMS devices are actuated;

FIGS. 14a–14d are density plots of the light distribution in different planes of FIG. 9 after the projection lens, wherein the conformal GEMS devices are not actuated and the ribbons have residual curvature;

FIG. 18 illustrates the spatial filter used in the third three-color embodiment of FIG. 17.

DETAILED DESCRIPTION OF THE INVENTION

Figure 1:
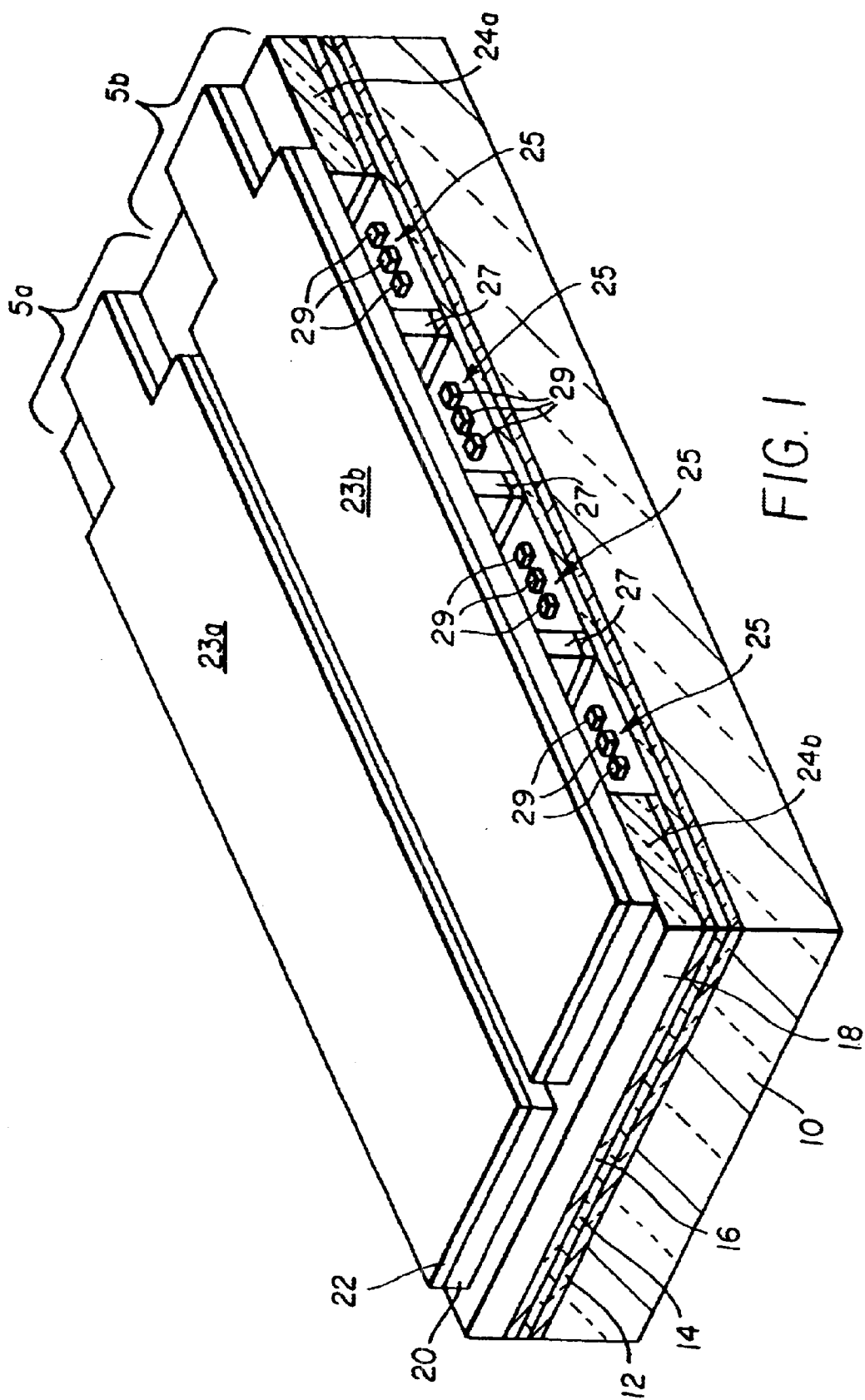
FIG. 1 is a perspective, partially cut-away view of two conformal GEMS devices in a linear array.
Figure 2:
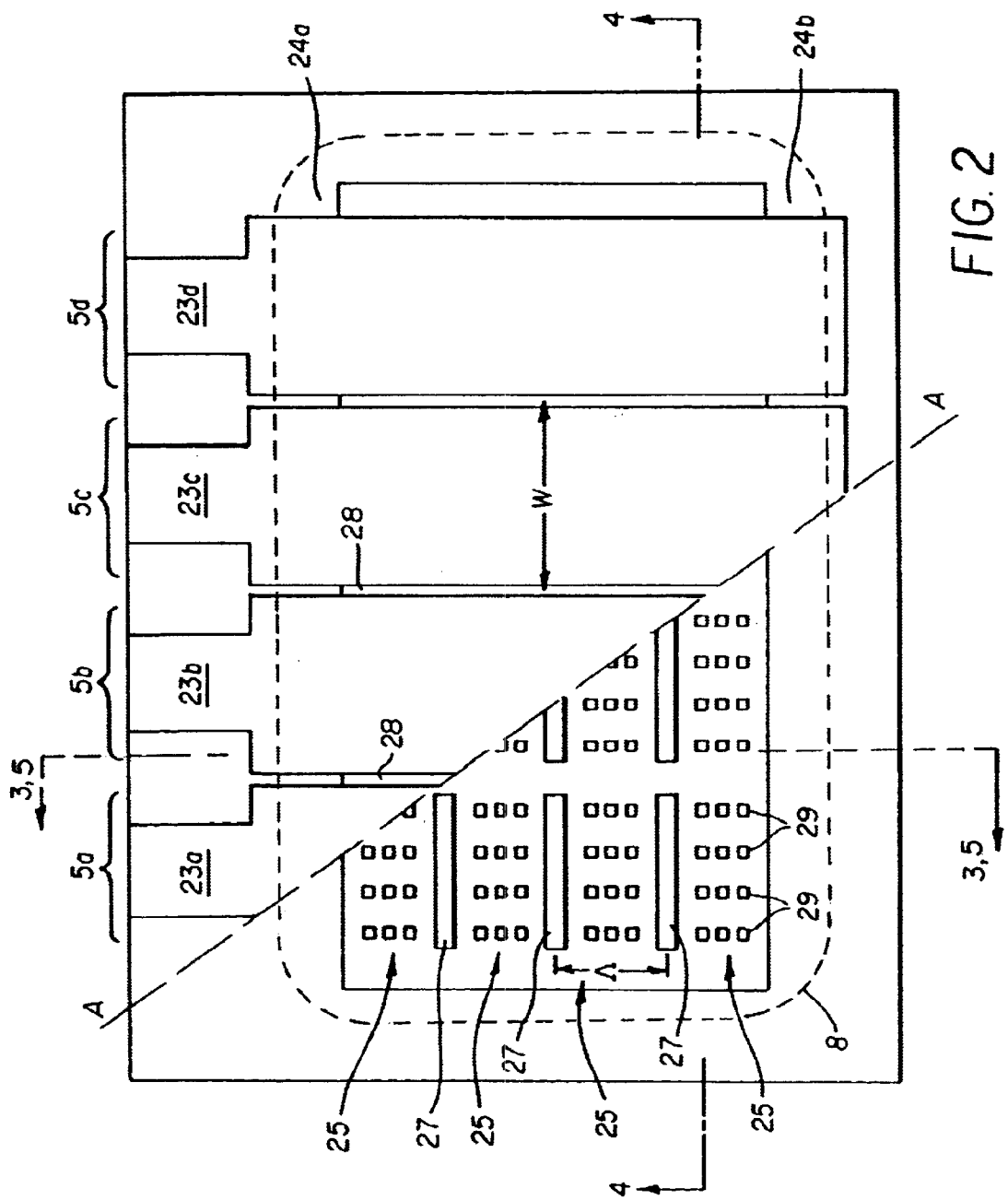
FIG. 2 is a top view of four conformal GEMS devices in a linear array.

The conformal Grating Electromechanical System (GEMS) devices are illustrated in FIGS. 1–3. FIG. 1 shows two side-by-side conformal GEMS devices 5a and 5b in an unactuated state. The conformal GEMS devices 5a and 5b are formed on top of a substrate 10 covered by a bottom conductive layer 12, which acts as an electrode to actuate the devices 5a, 5b. The bottom conductive layer 12 is covered by a dielectric protective layer 14 followed by a standoff layer 16 and a spacer layer 18. On top of the spacer layer 18, a ribbon layer 20 is formed which is covered by a reflective layer and conductive layer 22. The reflective and conductive layer 22 provides electrodes for the actuation of the conformal GEMS devices 5a and 5b. Accordingly, the reflective and conductive layer 22 is patterned to provide electrodes for the two conformal GEMS devices 5a and 5b. The ribbon layer 20, preferably, comprises a material with a sufficient tensile stress to provide a large restoring force. Each of the two conformal GEMS devices 5a and 5b has an associated elongated ribbon element 23a and 23b, respectively, patterned from the reflective and conductive layer 22 and the ribbon layer 20. The elongated ribbon elements 23a and 23b are supported by end supports 24a and 24b, formed from the spacer layer 18, and by one or more intermediate supports 27 that are uniformly separated in order to form equal-width channels 25. The elongated ribbon elements 23a and 23b are secured to the end supports 24a and 24b and to the intermediate supports 27. A plurality of square standoffs 29 is patterned at the bottom of the channels 25 from the standoff layer 16. These standoffs 29 reduce the possibility of the elongated ribbon elements 23a and 23b sticking when actuated.

A top view of a four-device linear array of conformal GEMS devices 5a, 5b, 5c and 5d is shown in FIG. 2. The elongated ribbon elements 23a, 23b, 23c, and 23d (respectively) are depicted partially removed over the portion of the diagram below the line A—A in order to show the underlying structure. For best optical performance and maximum contrast, the intermediate supports 27 should preferably be completely hidden below the elongated ribbon elements 23a, 23c, and 23d. Therefore, when viewed from the top, the intermediate supports 27 should not be visible in the gaps 28 between the conformal GEMS devices 5a–5d. Here, each of the conformal GEMS devices 5a–5d has three intermediate supports 27 with four equal-width channels 25. The center-to-center separation A of the intermediate supports 27 defines the period of the conformal GEMS devices in the actuated state. The elongated ribbon elements 23a–23d are mechanically and electrically isolated from one another, allowing independent operation of the four conformal GEMS devices 5a–5d. The bottom conductive layer 12 of FIG. 1 can be common to all of the conformal GEMS devices 5a–5d.

FIG. 3a is a side view, through line 3,5—3,5 of FIG. 2, of two channels 25 of the conformal GEMS device 5b (as shown and described in FIGS. 1 and 2) in an unactuated state. FIG. 3b shows the same view for an actuated state. For operation of the device, an attractive electrostatic force is produced by applying a voltage difference between the bottom conductive layer 12 and the reflective and conductive layer 22 of the elongated ribbon element 23b. In the unactuated state (see FIG. 3a), with no voltage difference, the ribbon element 23b is suspended flat between the supports. In this state, an incident light beam 30 is primarily reflected into a 0th order light beam 32, as in a simple planar mirror. To obtain the actuated state, a voltage is applied to the conformal GEMS device 5b, which deforms the elongated ribbon element 23b and produces a partially conformal GEMS with period A. FIG. 3b shows the device 5b (as shown and described in FIGS. 1 and 2) in the fully actuated state with the elongated ribbon element 23b in contact with standoffs 29. The height difference between the bottom of element 23b and the top of the standoffs 29 is chosen to be approximately ¼ of the wavelength λ of the incident light. The optimum height depends on the specific conformal shape of the actuated device. In the actuated state, the incident light beam 30 is primarily diffracted into the +1st order light beam 35a and −1st order light beam 35b, with additional light diffracted into the +2nd order 36a and −2nd order 36b. A small amount of light is diffracted into even higher orders and some light remains in the 0th order. In general, one or more of the various beams can be collected and used by an optical system, depending on the application. When the applied voltage is removed, the forces to tensile stress and bending restores the ribbon element 23b to its original unactuated state, as shown in FIG. 3a.

FIGS. 4a and 4b show a side view through line 4—4 of FIG. 2 of the conformal GEMS device 5b in the unactuated and actuated states, respectively. The conductive reflective ribbon element 23b is suspended by the end support 24b and the adjacent intermediate support 27 (not shown in this perspective). The application of a voltage actuates the device as illustrated in FIG. 4b.

In one embodiment, a linear array of conformal GEMS devices is formed by arranging the devices as illustrated in FIGS. 1–2 with the direction of the grating period A perpendicular to the axis of the array. The planes containing the various diffracted light beams then intersect in a line at the linear array and are distinct away from the linear array. Even with a large linear array consisting, possibly, of several thousand devices illuminated by a narrow line of light, the diffracted light beams become spatially separated in close proximity to the linear array. This feature simplifies the optical system design and allows for the selection of specific diffracted light beams without the use of Schlieren optics.

The conformal GEMS devices illustrated in FIGS. 1–4 would, when actuated, produce non-zero diffracted orders ($+1^{st}$ order 35a, $-1^{st}$ order 35b, $+2^{nd}$ order 36a and $-2^{nd}$ order 36b) that have very high contrast. This ideal situation arises if, in the unactuated state, the ribbon elements 23a, 23b, 23c and 23d are suspended perfectly flat between the intermediate supports 27 and, hence, do not cause any diffraction of light into non-zero diffracted orders. In practice, ribbon elements 23a, 23b, 23c and 23d will have a certain amount of curvature because of stress differences between the ribbon layer 20, which is typically silicon nitride, and the reflective and conductive layer 22, which is typically aluminum. This problem is illustrated in FIGS. 5a and 5b, which are similar to FIGS. 3a and 4a, respectively. FIG. 5a is a side view, through line 3,5—3,5 of FIG. 2, of two channels 25 of the conformal GEMS device 5b, with the addition of ribbon curvature. FIG. 5b shows a rotated side view of the same device along the direction of the ribbon width w. The ribbon curvature causes a weak grating to be present even when the conformal GEMS device 5b is not actuated, thus reducing system contrast. For high-quality projection displays, such as digital cinema projectors, a contrast above 1000:1 is often required. (Contrast is defined as the ratio of diffracted light intensity with the device actuated to diffracted light intensity with the device unactuated.)

Figure 6:
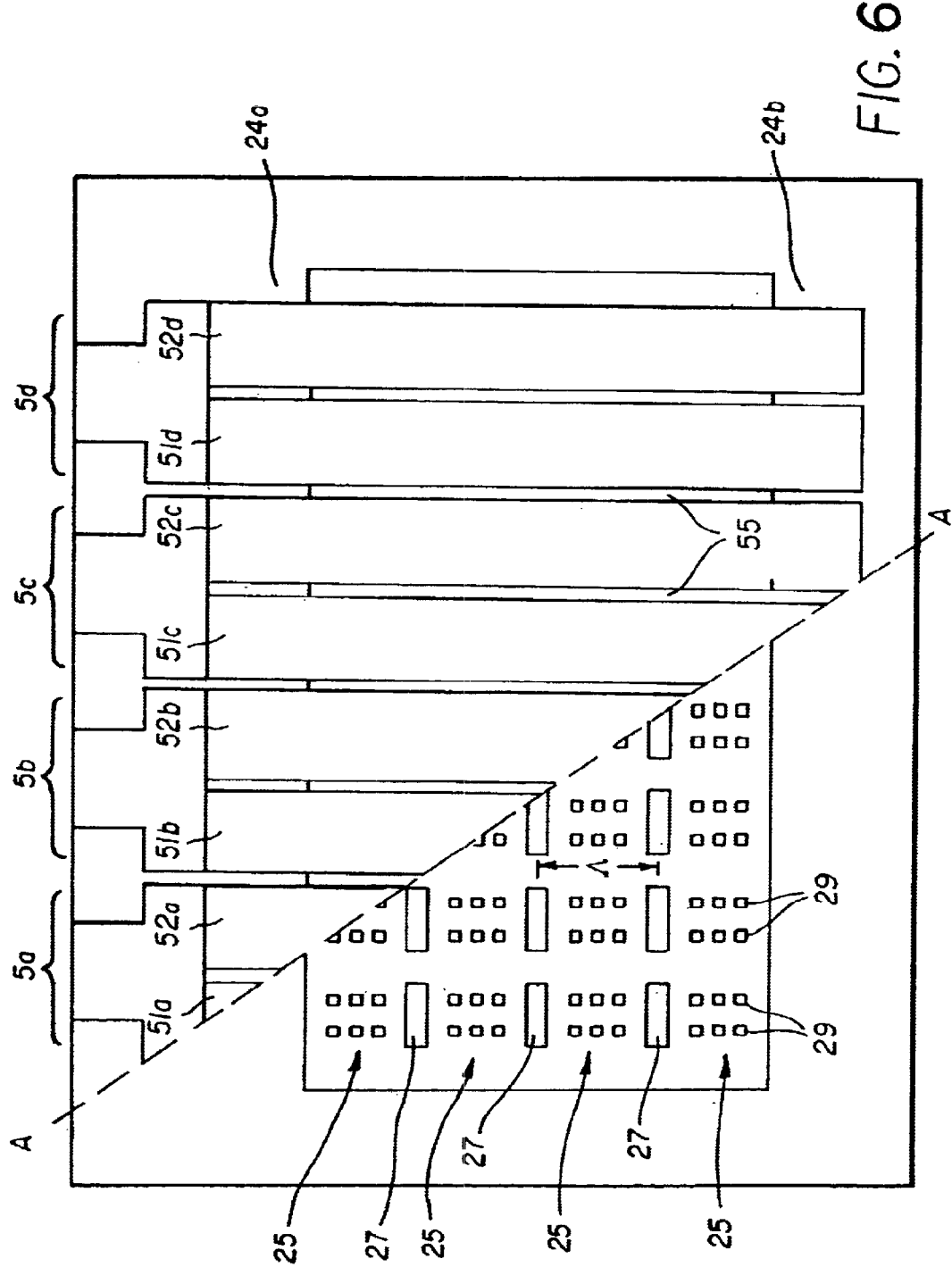
FIG. 6 is a top view of four conformal GEMS devices in a linear array, wherein each of the devices contains two ribbon elements.

An alternate embodiment of conformal GEMS devices is shown in FIG. 6, which depicts a top view of a four-device linear array similar to FIG. 2. Each of the conformal GEMS devices 5a, 5b, 5c, and 5d now has an associated pair of subdivided elongated conductive reflective ribbon elements (51a, 52a), (51b, 52b), (51c, 52c), and (51d, 52d), respectively. This subdivision of each conformal GEMS device 5a, 5b, 5c, and 5d permits fabrication of wider conformal GEMS devices, without significantly impacting optical performance. The preferred method of fabrication is to etch a sacrificial layer (not shown) from the channel 25, thus releasing the elongated conductive ribbon elements (51a, 52a), (51b, 52b), (51c, 52c), and (51d, 52d). The subdivided gaps 55 between the elongated conductive elements (51a, 52a), (51b, 52b), (51c, 52c), and (51d, 52d) allow the etchant to access this sacrificial layer. Increasing the number of subdivided gaps 55 can therefore improve the etching process. In practice, it may be necessary to further subdivide the conformal GEMS devices 5a, 5b, 5c, and 5d into more than two. The elongated-conductive reflective ribbon elements (51a, 52a), (51b, 52b), (51c, 52c), and (51d, 52d) are depicted partially removed over the portion of the diagram below the line A—A in order to show the underlying structure. For best optical performance and maximum contrast, the intermediate supports 27 should be completely hidden below the elongated-conductive reflective ribbon elements 51a, 52a, 51b, 52b, 51c, 52c, 51d, and 52d. Therefore, when viewed from the top, the intermediate supports 27 should not penetrate into the subdivided gaps 55. In general, the ribbon elements within a single conformal GEMS device are mechanically isolated, but electrically coupled. They therefore operate in unison when a voltage is applied.

Figure 7:
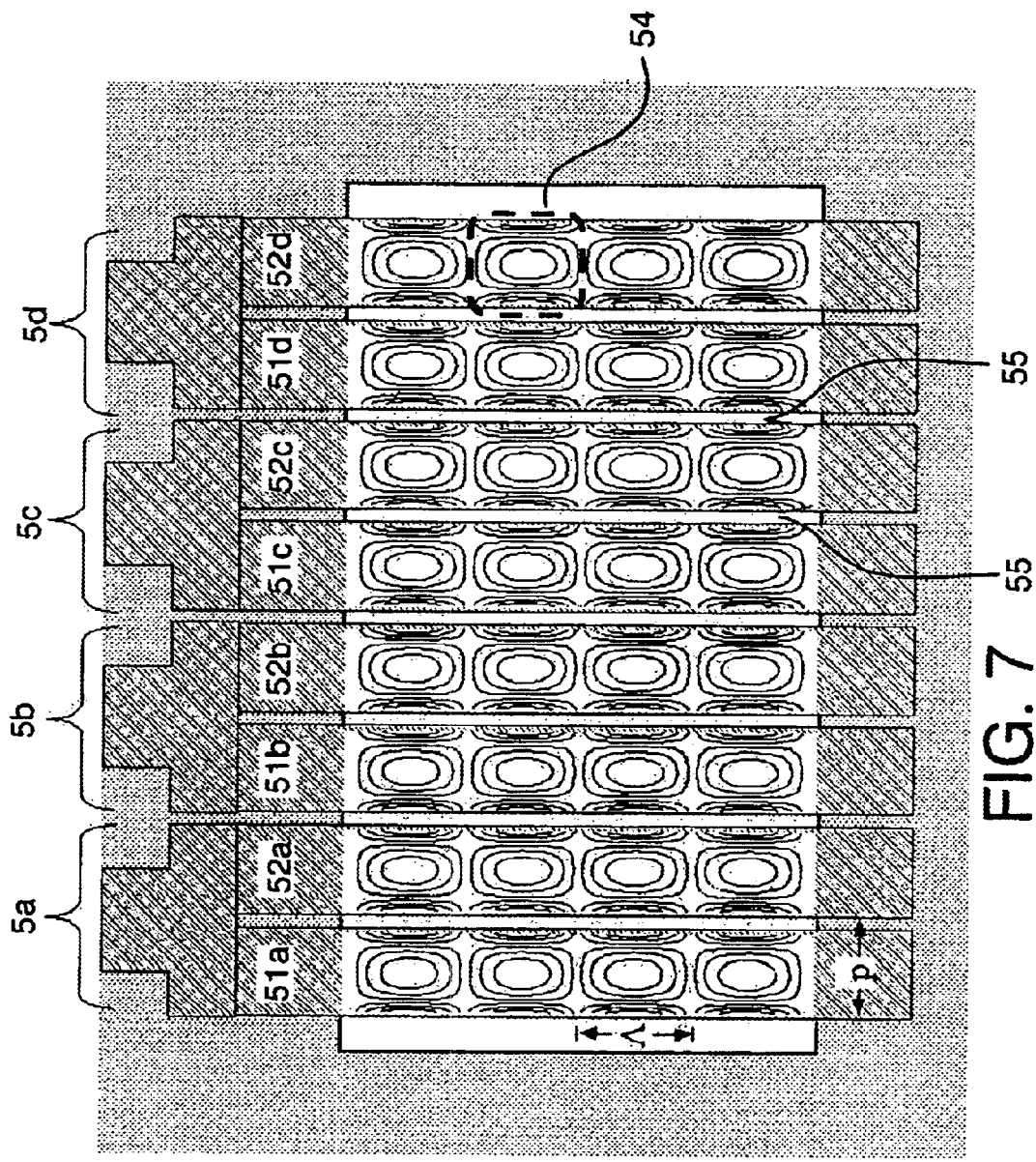
FIG. 7 is a topographical representation of residual ribbon curvature in conformal GEMS devices.
Figure 8:
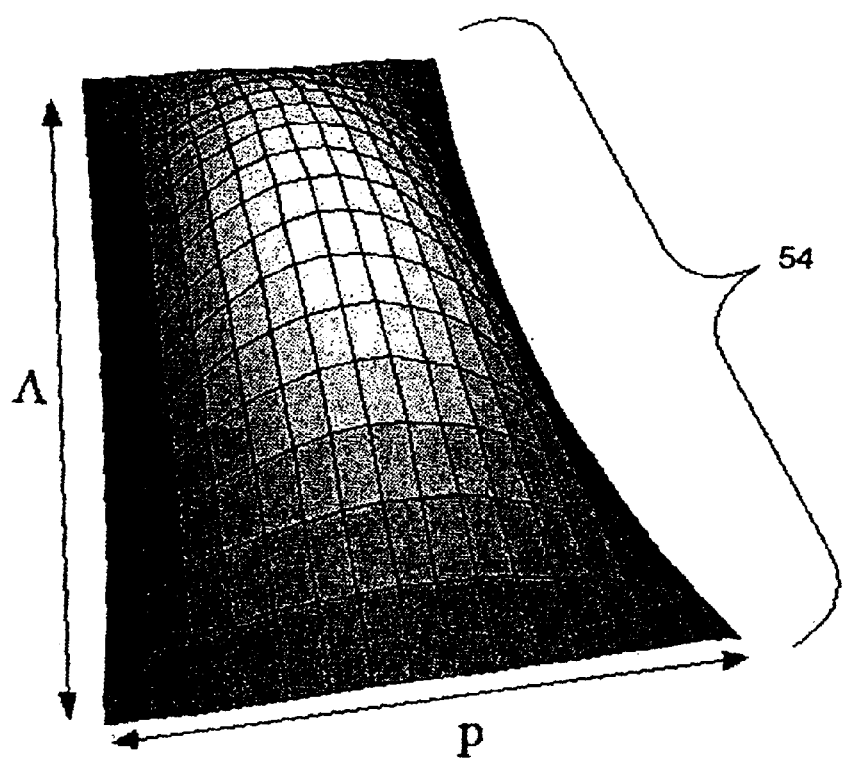
FIG. 8 is a three-dimensional plot of residual ribbon curvature in a single cell of FIG. 7.

FIG. 7 is a top view illustration of an unactuated linear array of conformal GEMS devices 5a–5d, similar to FIG. 6, with a contour map overlay of the ribbon elements' surface profile showing ribbon curvature. Each cell 54 within the elongated-conductive ribbon elements 51a, 52a, 51b, 52b, 51c, 52c, 51d, and 52d has a saddle-like shape, shown in more detail in the three-dimensional plot of FIG. 8. As visible in the top view of FIG. 7, cells 54 form a two-dimensional periodic pattern that acts as a reflective crossed grating. Typically, in manufactured conformal GEMS devices, the peak-to-peak height of the crossed grating is less than 40 nm, i.e., less than a tenth of a wavelength for visible wavelengths. The period of the crossed grating along the length of the elongated-conductive reflective ribbon elements 51a–51d and 52a–52d is equal to the conformal GEMS period $\Lambda$, as determined by the placement of the intermediate supports 27. The period of the crossed grating in the perpendicular direction is the ribbon period p.

As described in co-pending U.S. Patent Application Ser. No. 10/158,516, filed May 30, 2002, by Marek W. Kowarz et al., and titled "Method For Manufacturing A Mechanical Conformal Grating Device With Improved Contrast And Lifetime," the saddle-like shape of each cell 54 can be significantly flattened by careful refinement of the manufacturing process, thus reducing the peak-to-peak height of the weak crossed grating. A display system based on a linear array of conformal GEMS devices was described by Kowarz et al. in U.S. Pat. No. 6,411,425, issued Jun. 25, 2002, entitled "Electrochemical Grating Display System with Spatially Light Beam." However, when conformal GEMS devices with appreciable ribbon curvature are used in the display system of U.S. patent application Ser. No. 09/671,040, the diffracted cross-orders reduce image contrast. To further improve image contrast in a system, the diffracted light (cross-orders) generated by the crossed grating can be prevented from reaching the image plane.

Figure 9:
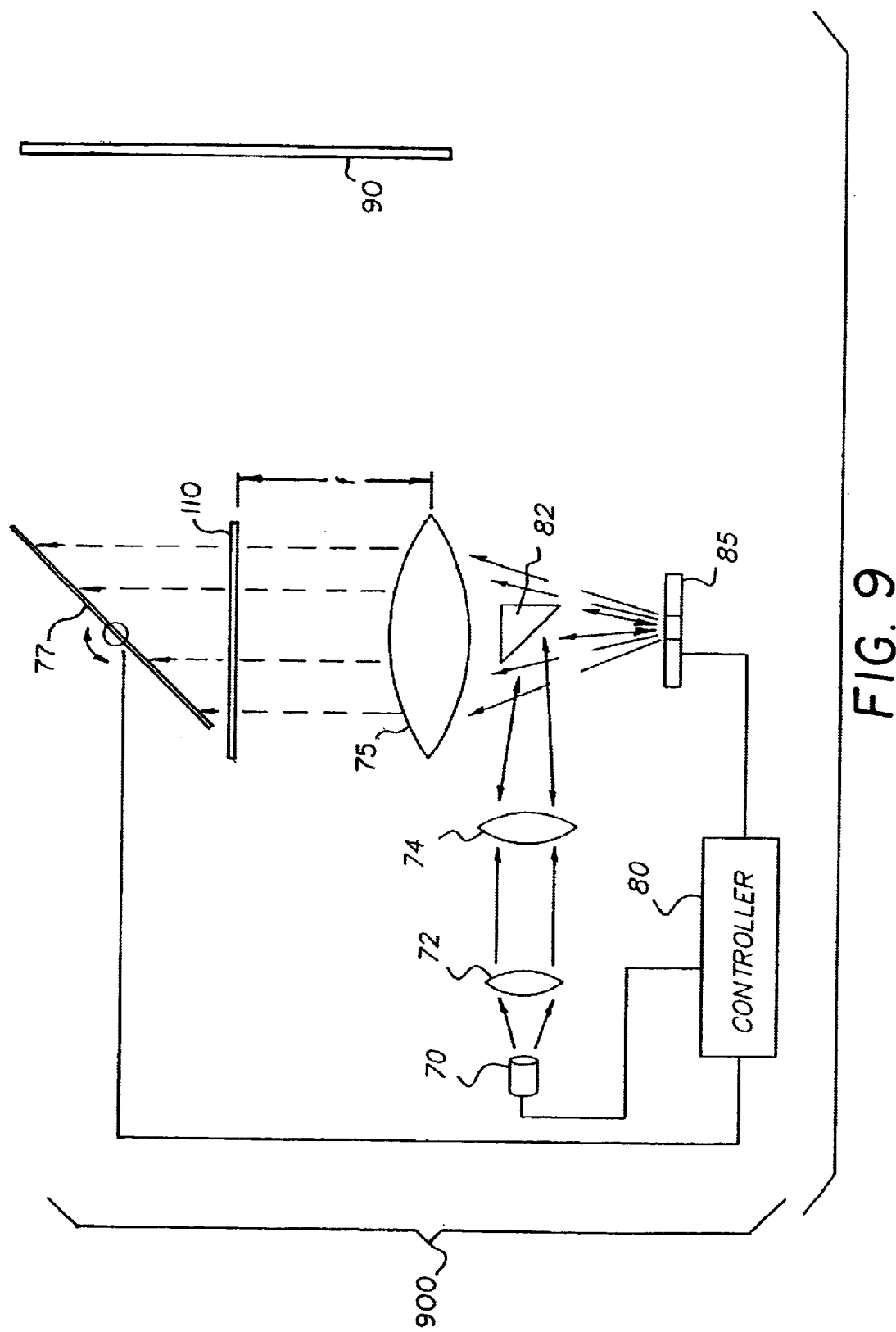
FIG. 9 is a schematic illustrating a line-scanned display system with high contrast according to the present invention.

FIG. 9 shows a high-contrast display system 900 containing a linear array 85 of conformal GEMS devices that eliminates the contrast-reducing cross-orders. Light emitted from a source 70 is conditioned by a pair of lenses 72 and 74, before hitting a turning mirror 82 and illuminating the linear array 85. The display system 900 forms an entire two-dimensional scene from a scan of a one-dimensional line image of the linear array 85 across the screen 90. The conformal GEMS devices of the linear array 85 are capable of rapidly modulating incident light to produce multiple lines of pixels with gray levels. The controller 80 selectively activates the linear array 85 to obtain the desired pixel pattern for a given line of a two-dimensional scene. If a particular conformal GEMS device is actuated, it reflects the incident light beam primarily into the 0th order light beam, which is directed back towards the source 70 by the turning mirror 82. If a particular conformal GEMS device is actuated, it diffracts the incident light beams primarily into $+2^{nd}$, $+1^{st}$, $-1^{st}$ and $-2$nd order light beams. These diffracted light beams pass around the turning mirror 82 and are projected on the screen 90 by the projection lens system 75. A cross-order filter 110 placed near the Fourier (focal) plane "f" of the projection lens system 75 prevents the undesirable diffracted cross-orders from reaching the screen 90. The function of the cross-order filter 110 is described later in more detail. The scanning mirror 77 sweeps the line image across the screen 90 to form the two-dimensional scene. The controller 80 provides synchronization between the sweep of the scanning mirror 77 and a data stream that provides the scene content.

Figure 10:
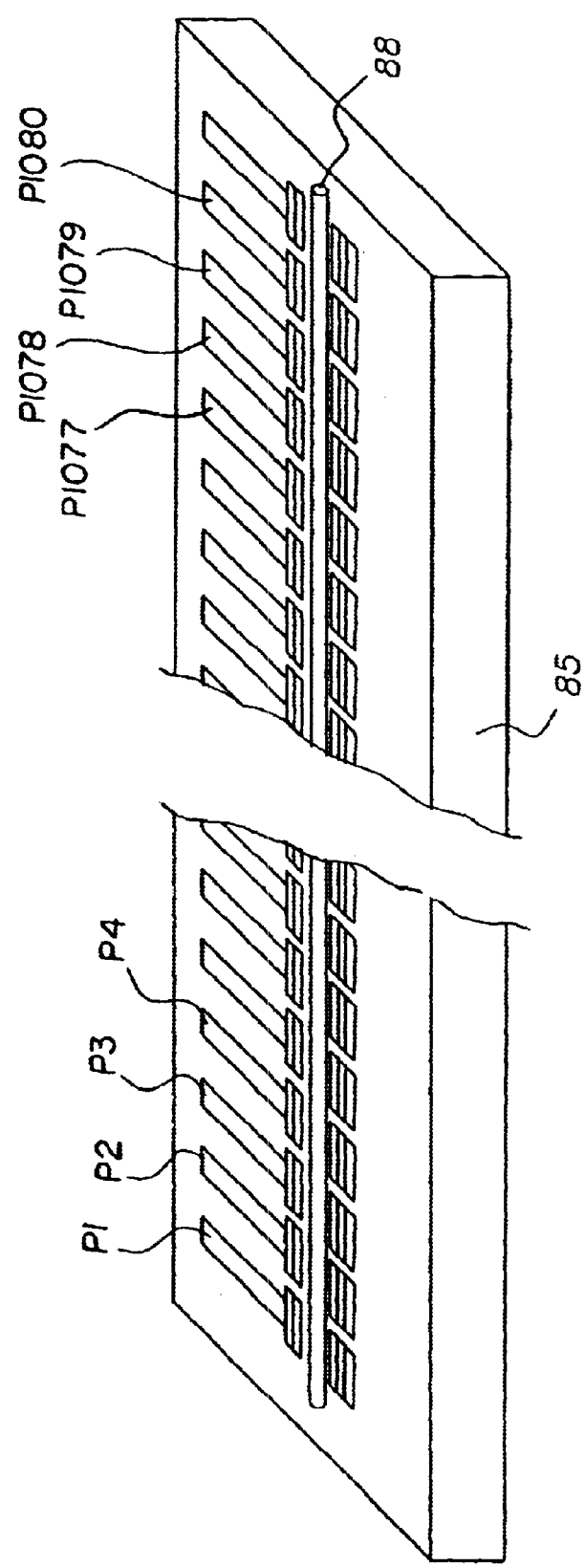
FIG. 10 shows a linear array of conformal GEMS devices illuminated by a line of light.
Figure 11:
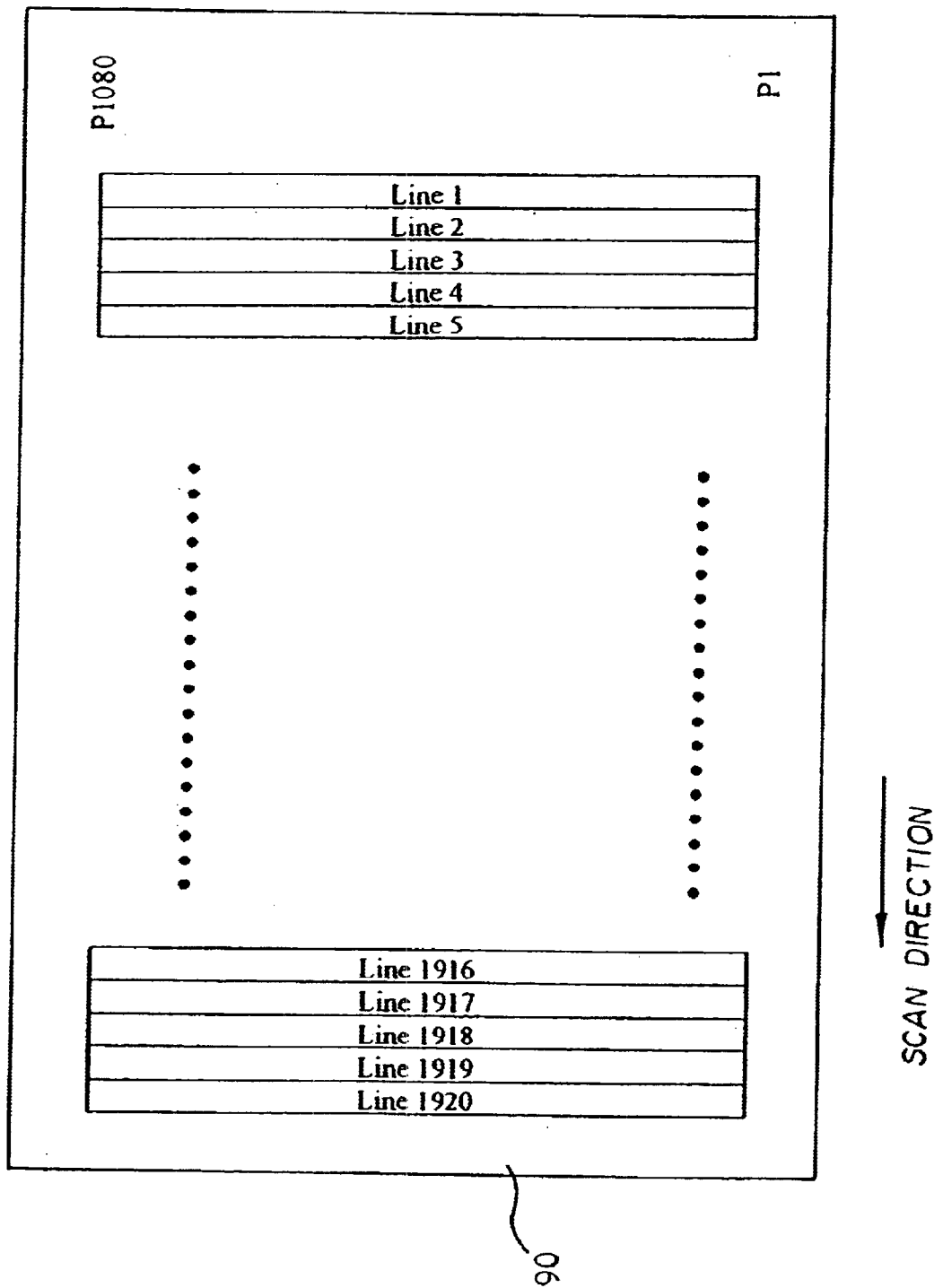
FIG. 11 is a view of the projection screen that illustrates the formation of a two-dimensional image by scanning a line image across the screen.

FIG. 10 depicts a linear array 85 of conformal GEMS devices (P1 . . . P1080) illuminated by a line of light 88 parallel to the long axis of the linear array 85. For illustration purposes, there are 1080 individually operable conformal GEMS devices shown, labeled P1 through P1080. The grating period $\Lambda$ (not shown) is preferably perpendicular to the long axis of the linear array 85 and to the line of light 88. FIG. 11 is a view facing the screen 90 of the display system 900, shown in FIG. 9, and depicts the formation of the two-dimensional scene. In this illustration, HDTV resolution is obtained by scanning the image of the linear array 85 of 1080 conformal GEMS devices to generate 1920 sequential lines, thereby producing a scene with 1080 by 1920 pixels.

FIGS. 12a–12d illustrate the propagation of the diffracted light beams through the display system 900 of FIG. 9 in several planes prior to the projection lens system 75. Continuing, FIGS. 13a–13d show the light distribution after the projection lens system 75. In this example, the light source 70 is a laser, the lens has a focal length f of 50 mm, the linear array is 1 cm long and all of the conformal GEMS devices on the linear array 85 are turned on. As the various diffracted light beams propagate from one plane to the next, they spread out in a direction perpendicular to the axis of the linear array 85. Here D refers to the distance between the linear array 85 to the plane of interest. The diffracted beams become spatially separated within a few millimeters from the linear array 85 and remain spatially separated throughout the display system 900, except near the screen 90 (and any intermediate image planes of the linear array 85). FIG. 12d shows the light distribution at the turning mirror 82, which is located close to the projection lens system 75. The turning mirror 82 blocks the unwanted $0^{th}$ diffracted order and reflects it back towards the source 70. In this example, six diffracted orders from $-3^{rd}$ to $-1^{st}$ and $+1^{st}$ to $+3^{rd}$ are allowed to pass through the projection lens system 75. FIGS. 13a–13d show these diffracted orders after they have gone through the projection lens system 75. Near the Fourier plane (D=100 mm), the diffracted orders are tightly focused into six spots. It is, therefore, preferable to place the scanning mirror 77 close to the Fourier plane to minimize its size and weight. Eventually, as the six diffracted orders continue propagating towards the screen 90, they again become overlapping spatially near the image plane at the screen 90.

FIGS. 12a–12d and 13a–13d describe light propagation through the display system 900 of FIG. 9 when all of the conformal GEMS devices of the linear array 85 are turned on. Obviously, when the conformal GEMS devices are turned off, any light that is not obstructed will reduce the contrast and quality of the image on the screen 90. FIGS. 14a–14d illustrate the off-state light distribution in several planes after the projection lens system 75 of FIG. 9. The conformal GEMS devices modeled in FIGS. 14a–14d have ribbon curvature that produces a weak crossed grating. Some light is still present in the primary $+1^{st}$ and $-1^{st}$ orders. However, because the conformal GEMS devices are off, the intensity of these orders is substantially less, often by a factor of 1000 or more, than the corresponding orders in FIGS. 12a–12d and 13a–13d. The higher orders, $-3^{rd}$, $-2^{nd}$, $+2^{nd}$ and $+3^{rd}$, are now reduced to the point that they are not visible in the figures. The crossed grating generates four dominant diffracted cross-orders labeled (+1,+1), (+1,−1), (−1,+1) and (−1,−1) in FIGS. 14b and 14c. As shown in FIG. 14c, by placing a cross-order filter 110 substantially near the Fourier plane of the projection lens system 75, the aforementioned four cross-orders can be separated and blocked while leaving the desired diffracted orders unaffected. In order to effectively separate the diffracted cross-orders from the primary $+1^{st}$ and $-1^{st}$ orders, the cross-order filter should be placed at a distance less than approximately $(f^2\lambda)/(L\Lambda)$ from the Fourier plane, where $\lambda$ is the wavelength and L is the length of the linear array 85. The cross-order filter 110 increases system contrast without substantially decreasing optical efficiency. The contrast improvement enabled by the addition of the cross-order filter 110 depends on the exact profile of the crossed grating, i.e., on the specific saddle-like shape of each cell 54.

Clearly, there are two kinds of light beams in display system 900: (1) those that are blocked by obstructing elements from reaching the screen 90, and (2) those that pass around obstructing elements to form an image on the screen 90. In the system of FIG. 9, the obstructing elements are the turning mirror 82 that blocks the $0^{th}$ order light beam and the cross-order filter 110 that blocks the (+1,+1), (+1,−1), (−1,+1) and (−1,−1) diffracted cross-orders. In subsequent embodiments, similar obstructing elements are used to prevent unwanted diffracted light beams from reaching the screen. As is well known to those skilled in the art, a variety of elements may be used for this purpose. For example, cross-order filter 110 could be an absorbing stop or a pair of tilted mirrors. Alternatively, the scanning mirror 77 could be designed so that the diffracted cross-orders pass above and below the mirror edges, therefore, never becoming part of the image. This appropriately-sized scanning mirror 77 would then also function as a cross-order filter.

In general, to effectively separate and obstruct the various diffracted light beams, the light illuminating the linear array of conformal GEMS devices needs to have a relatively small spread in angles of incidence. For example, if the conformal GEMS devices have a period of 30 microns and the illuminating wavelength is 532 nm, the angular separation between the $0^{th}$ order light beam and the $+1^{st}$ order light beam is approximately 1 degree. Therefore, the total angular spread of the light incident upon the linear array should be less than 1 degree, in the plane perpendicular to the linear array. Similarly, in order to create distinct diffracted cross-orders at the Fourier plane of the projection lens, the angular spread of the incident light should also be sufficiently narrow in the plane parallel to the linear array. A coherent laser is the most optically efficient for generating light with such a narrow range of incident angles. For incoherent sources, such as filament lamps and light emitting diodes, a vast majority of the optical power would be wasted by the illumination system in the process of generating the required illumination.

The embodiment of FIG. 9 can be used either for single color or for color-sequential display systems. For a color-sequential display, the light source 70 produces a plurality of colors that are sequential in time and the controller 80 is synchronized with the light source 70. For example, if the light source 70 consists of three combined red, green, and blue lasers, these are turned on sequentially to produce overlapping red, green, and blue images on the screen 90. The image data sent by the controller 80 to the linear array 85 is synchronized with the respective turned-on laser color.

Figure 15:
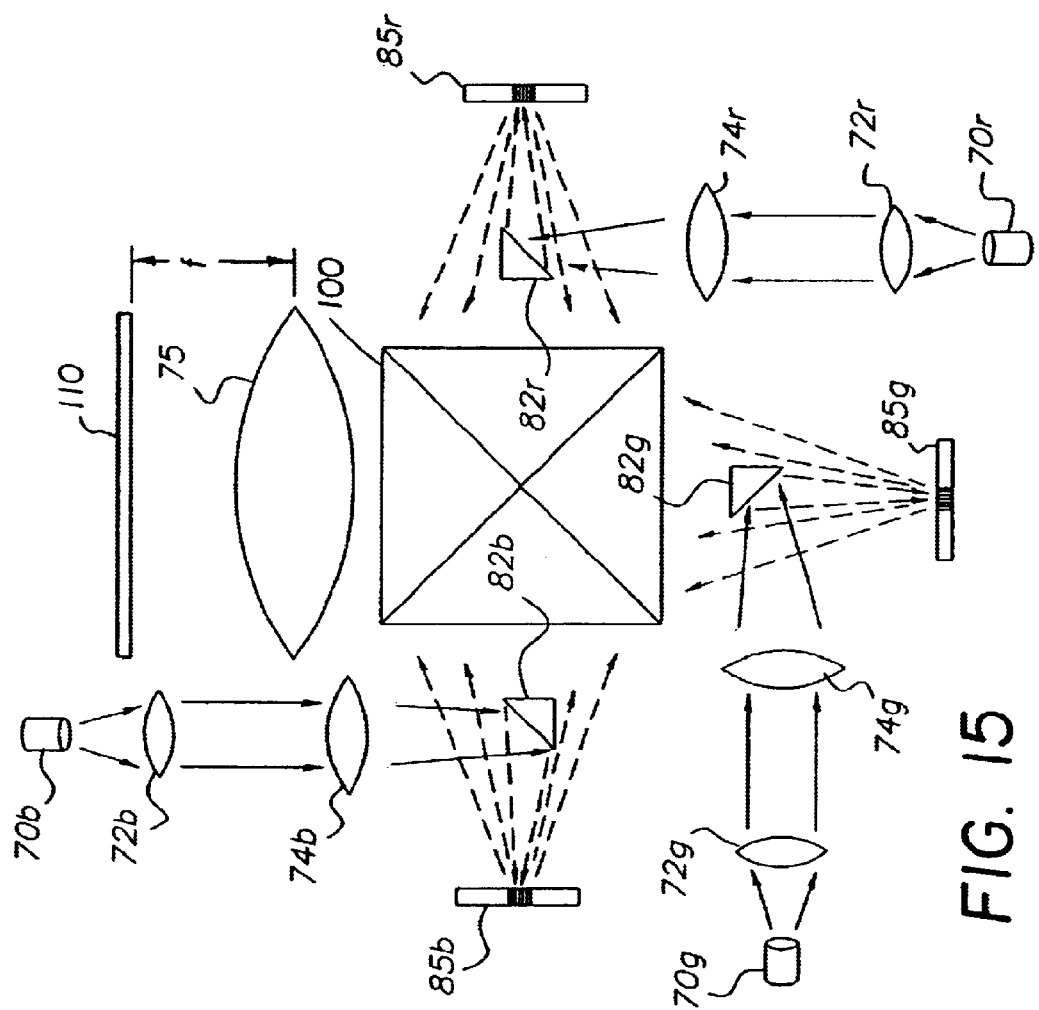
FIG. 15 is a schematic illustrating a three-color embodiment of a line-scanned display system with high contrast.
Figure 16:
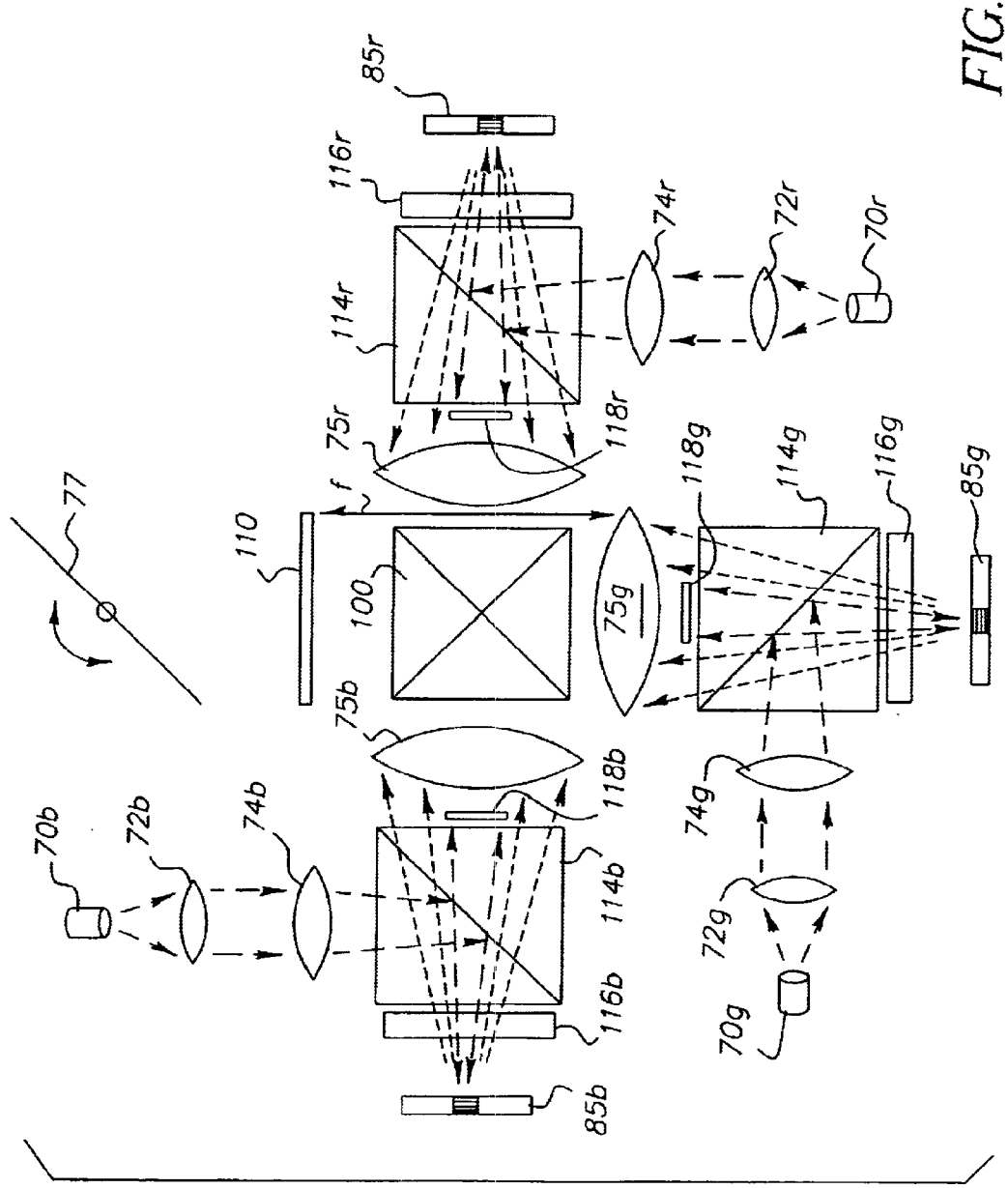
FIG. 16 is a schematic illustrating a second three-color embodiment of a line-scanned display system with high contrast.
Figure 17:
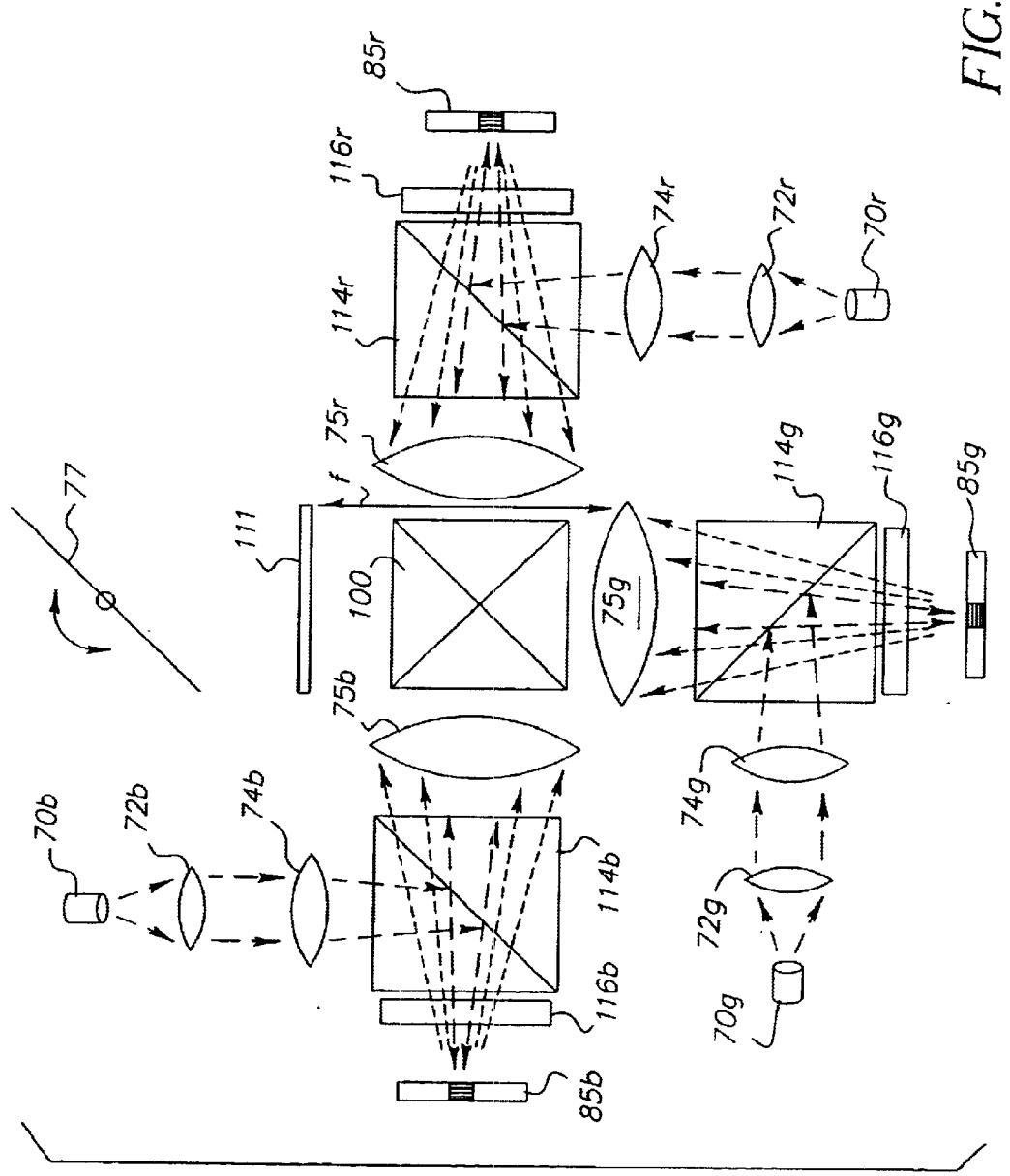
FIG. 17 is a schematic illustrating a third three-color embodiment of a line-scanned display system with high contrast.

Color-sequential display systems waste two-thirds of the available light because only one color is used at a time. FIGS. 15, 16, and 17 depict embodiments of the invention that project three colors simultaneously, (for example, red, green, and blue). In FIG. 15, three separate light sources 70r, 70g, 70b, each with their own illumination optics 72r, 72g, 72b, 74r, 74g, 74b, provide light to the three linear arrays 85r, 85g, 85b via three turning mirrors 82r, 82g, 82b. Red light illuminates linear array 85r, green light linear array 85g and blue light linear array 85b. The $-3^{rd}$, $-2^{nd}$, $-1^{st}$, $+1^{st}$, $+2^{nd}$, and $+3^{rd}$ order light beams emerging from the three linear arrays 85r, 85g, 85b, are combined by a color-combining element, shown as a color-combining cube 100 in FIG. 15. The $0^{th}$ order light beams are directed towards their respective sources by the turning mirrors 82r, 82g, 82b. A single projection lens system 75 forms a three-color line image of the three linear arrays 85r, 85g, 85b on the screen 90 (not shown in figure). As before, the sweep of the scanning mirror 77 (not shown in figure) generates a two-dimensional image from the line image. To increase system contrast, cross-orders are removed by the cross-order filter 110 at the Fourier plane of the projection lens 75.

FIG. 16 shows an alternate color-simultaneous embodiment in which the three turning mirrors 82r, 82g, 82b of FIG. 15 are replaced by polarization beam splitters 114r, 114g, 114b with ¼ wave plates 116r, 116g, 116b and $0^{th}$ order stops 118r, 118g, 118b. The combination of polarization beam splitter, ¼ wave plate and $0^{th}$ order stop provides easier alignment tolerances than when the illumination and obstruction functions are combined, as in the turning mirror solution. For further system flexibility, the system of FIG. 16 contains three separate projection lenses 75r, 75g, 75b.

FIG. 17 shows a variation of the system in FIG. 16 in which a single spatial filter 111 placed at the Fourier plane of the projection lenses 75r, 75g, 75b replaces the three $0^{th}$ order stops 118r, 118g, 118b and the cross-order filter 110. As shown in FIG. 18, the spatial filter 111 has a $0^{th}$ order portion 111b to block $0^{th}$ order light beams and a cross-order portion 111a to block cross-orders.

Although the above embodiments describe display systems, the same principles can be used to implement high-contrast printing systems based on linear arrays of conformal GEMS devices. Instead of a screen 90, the image medium would be a light reactive material, such as photographic paper, thermally activated media, or thermal transfer media. Furthermore, the scanning mirror 77 would typically be replaced by a paper transport system that serves as the scanning element. A more detailed description of conformal GEMS printing systems is found in U.S. Pat. No. 6,411,425.

The invention has been described in detail with particular reference to certain preferred embodiments thereof, but it will be understood that variations and modifications can be effected within the spirit and scope of the invention.

PARTS LIST 5a conformal GEMS device
5b conformal GEMS device
5c conformal GEMS device
5d conformal GEMS device
10 substrate
12 bottom conductive layer
14 dielectric protective layer
16 standoff layer
18 spacer layer
20 ribbon layer
22 reflective and conductive layer
23a elongated ribbon element
23b elongated ribbon element
23c elongated ribbon element
23d elongated ribbon element
24a end support
24b end support
25 channel
27 intermediate support
28 gap
29 standoff
30 incident light beam
32 $0^{th}$ order light beam
35a $+1^{st}$ order light beam
35b $-1^{st}$ order light beam
36a $+2^{nd}$ order light beam
36b $-2^{nd}$ order light beam
51a elongated conductive ribbon element
51b elongated conductive ribbon element
51c elongated conductive ribbon element
51d elongated conductive ribbon element Parts List—continued 52a elongated conductive ribbon element
52b elongated conductive ribbon element
52c elongated conductive ribbon element
52d elongated conductive ribbon element
54 cell
55 subdivided gaps
70 light source
70r light source
70g light source
70b light source
72 lens
72r illumination optics
72g illumination optics
72b illumination optics
74 lens
74r illumination optics
74g illumination optics
74b illumination optics
75 projection lens system
75r projection lens
75g projection lens
75b projection lens
77 scanning mirror
80 controller
82 turning mirror
82r turning mirror
82g turning mirror
82b turning mirror
85 linear array
85r linear array Parts List—continued 85g linear array
85b linear array
88 line of light
90 screen
100 color-combining cube
110 cross-order filter
111 spatial filter
111a cross-order portion of spatial filter
111b zeroth-order portion of spatial filter
114r polarization beam splitter
114g polarization beam splitter
114b polarization beam splitter
116r ¼ waveplate
116g ¼ waveplate
116b ¼ waveplate
118r zeroth-order stop
118g zeroth-order stop
118b zeroth-order stop
900 display system

What is claimed is:

1. An improved projection system that includes a conformal grating electromechanical system (GEMS) device for forming an image on a medium, comprising:
   a) a light source providing illumination;
   b) a linear array of conformal GEMS devices receiving the illumination;
   c) an obstructing element for blocking a zeroth order reflected light beam from reaching the medium;
   d) a cross-order filter, placed substantially near a Fourier plane of a lens system, for blocking a plurality of diffracted cross-order light beams from reaching the medium;
   e) a scanning element for moving non-obstructed diffracted light beams relative to the medium, and
   f) a controller for providing a data stream to the linear array of conformal GEMS devices.

2. The improved projection system as claimed in claim 1, wherein the medium is a light reactive printing material.

3. The improved projection system as claimed in claim 1, wherein the medium is a display screen.

4. The improved projection system as claimed in claim 1, wherein the obstructing element is a turning mirror.

5. The improved projection system as claimed in claim 1, wherein the obstructing element is placed between the linear array and a first lens of the lens system.

6. The improved projection system as claimed in claim 1, wherein the obstructing element is placed after a first lens and before a Fourier plane of the lens system.

7. The improved projection system as claimed in claim 1, wherein the scanning element is placed at a Fourier plane of the lens system and the obstructing element is placed between the linear array and the scanning element.

8. The improved projection system as claimed in claim 1, wherein the obstructing element is simultaneously used for delivery of light from the light source to the linear array.

9. The improved projection system as claimed in claim 1, wherein the obstructing element further comprises:
   a polarization sensitive beam splitter;
   a waveplate; and
   a stop to block the zeroth order reflected light beam.

10. The improved projection system as claimed in claim 1, wherein the cross-order filter blocks (+1,+1), (+1,−1), (−1,+1) and (−1,−1) orders of the diffracted cross-order light beams.

11. The improved projection system as claimed in claim 1, wherein the scanning element is an appropriately-sized scanning mirror so that the diffracted cross-order light beams pass above and below the scanning mirror, thus being functionally equivalent to the cross-order filter.

12. The improved projection system as claimed in claim 1, wherein the obstructing element and the cross-order filter are structurally integrated.

13. An improved projection system that includes a conformal grating electromechanical system (GEMS) device for forming a multi-color image on a medium, comprising:
   a) a plurality of light sources providing illumination;
   b) at least one linear array of conformal GEMS devices receiving the illumination;
   c) an obstructing element for blocking a zeroth order reflected light beam from reaching the medium;
   d) a cross-order filter, placed substantially near a Fourier plane of a lens system, for blocking a plurality of diffracted cross-order light beams from reaching the medium;
   e) a scanning element for moving non-obstructed diffracted light beams relative to the medium; and
   f) a controller for providing a data stream to at least one linear array of conformal GEMS devices receiving the illumination.

14. The improved projection system as claimed in claim 13, wherein the medium is a light reactive printing material.

15. The improved projection system as claimed in claim 13, wherein the medium is a display screen.

16. The improved projection system as claimed in claim 13, wherein the obstructing element is a turning mirror.

17. The improved projection system as claimed in claim 13, wherein the obstructing element is placed between the linear array and a first lens of the lens system.

18. The improved projection system as claimed in claim 13, wherein the obstructing element is placed after a first lens and before a Fourier plane of the lens system.

19. The improved projection system as claimed in claim 13, wherein the scanning element is placed at a Fourier plane of the lens system and the obstructing element is placed between the linear array and the scanning element.

20. The improved projection system as claimed in claim 13, wherein the obstructing element is simultaneously used for delivery of light from the light source to the linear array.

21. The improved projection system as claimed in claim 13, wherein the obstructing element further comprises:
   a polarization sensitive beam splitter;
   a waveplate; and
   a stop to block the zeroth order reflected light beam.

22. The improved projection system as claimed in claim 13, wherein the cross-order filter blocks (+1,+1), (+1,−1), (−1,+1), and (−1,−1) orders of the diffracted cross-order light beams.

23. The improved projection system as claimed in claim 13, wherein the scanning element is an appropriately-sized scanning mirror so that the diffracted cross-order light beams pass above and below the scanning mirror, thus being functionally equivalent to the cross-order filter.

24. The improved projection system as claimed in claim 13, wherein the obstructing element and the cross-order filter are structurally integrated.

25. The improved projection system as claimed in claim 13, further comprises at least three light sources of different colors.

26. The improved projection system as claimed in claim 25, wherein the at least three light sources each illuminate a different and respective linear array of conformal GEMS devices.

27. The improved projection system as claimed in claim 26, further comprises a color-combining element.

28. The improved projection system as claimed in claim 27, wherein each different and respective linear array of conformal GEMS devices has its own obstructing element prior to the color-combining element, and a single cross-order filter is placed after the color-combining element.

29. The improved projection system as claimed in claim 27, wherein the obstructing element and the cross-order filter are structurally integrated.

30. The improved projection system as claimed in claim 1, wherein the light source is a laser.

31. The improved projection system as claimed in claim 13, wherein the plurality of light sources are lasers.

32. The improved projection system as claimed in claim 1, wherein a grating period is oriented perpendicular to a long axis of the linear array.

33. The improved projection system as claimed in claim 13, wherein a grating period is oriented perpendicular to a long axis of the linear array.

* * * * *